(12) United States Patent
Chase et al.

(10) Patent No.: US 10,540,655 B2
(45) Date of Patent: Jan. 21, 2020

(54) AUTOMATIC RECONCILIATION OF DATA STRUCTURES

(71) Applicant: Ariba, Inc., Sunnyvale, CA (US)

(72) Inventors: Chris Chase, Palo Alto, CA (US);
Lingyan Zhang, Fremont, CA (US);
Xiangqun Hu, Palo Alto, CA (US);
Tanvi Shah, Sunnyvale, CA (US);
Vijay Chandramouli, San Jose, CA (US); Yuan Tung, Fremont, CA (US)

(73) Assignee: Ariba, Inc., Sunnyvale, CA (US)

( * ) Notice: Subject to any disclaimer, the term of this patent is extended or adjusted under 35 U.S.C. 154(b) by 845 days.

(21) Appl. No.: 14/981,658

(22) Filed: Dec. 28, 2015

(65) Prior Publication Data

US 2017/0185978 A1    Jun. 29, 2017

(51) Int. Cl.
*G06Q 20/38*    (2012.01)
*G06Q 30/02*    (2012.01)

(52) U.S. Cl.
CPC ....... *G06Q 20/387* (2013.01); *G06Q 30/0222* (2013.01)

(58) Field of Classification Search
CPC ............ G06Q 20/201; G06Q 30/0206; G06Q 30/0283; G06Q 20/387
See application file for complete search history.

(56) References Cited

U.S. PATENT DOCUMENTS

| | | | | |
|---|---|---|---|---|
| 2011/0258004 | A1* | 10/2011 | Dean | G06F 19/328 705/4 |
| 2011/0295725 | A1* | 12/2011 | Gee | G06F 19/328 705/30 |
| 2013/0325722 | A1* | 12/2013 | Mohan | G06Q 20/14 705/44 |
| 2014/0200909 | A1* | 7/2014 | Felix | G06Q 50/22 705/2 |
| 2016/0063201 | A1* | 3/2016 | Allen | G06F 19/328 705/2 |

* cited by examiner

*Primary Examiner* — A. Hunter Wilder
(74) *Attorney, Agent, or Firm* — Schwegman Lundberg & Woessner, P.A.

(57) ABSTRACT

In an example embodiment, a data structure is received and automatically reconciled with other data structures in a computer system by comparing fields such as dates, transaction amounts, and discount amounts. A user is alerted as to whether the matches or discrepancies occur by displaying a message in a user interface.

20 Claims, 9 Drawing Sheets

PAYMENT DETAILS

Payment Method: ACH
Reference Number: 504889348 — 402

Routing Status: Sent
Transaction Date: 14 Jan. 2015
Projected Settlement: 15 Jan. 2015 — 410

400

LINE ITEMS (10)

| Line # | Payable Reference | Gross Amount | Discount | Adjustment | Net Amount Paid | Scheduled Payment |
|---|---|---|---|---|---|---|
| 1 | Invoice: 46913 (Show Summary) | $1,224.40 USD | $24.49 USD (Matched) | | $1,199.91 USD | SP323233 |
| | MATCHING INVOICE Original Invoice Date: 18 Nov. 2015 | | 406 | | Invoice Subtotal: $1,224.40 USD | |
| | MATCHING DISCOUNT Lingyan accepted 2% discount on Jan. 1, 2015 to be paid on Jan. 15, 2015. | | | | Total Tax: $0.00 USD | |
| | | | | | Invoice Total: $1,224.40 USD | |
| 2 | Invoice: 46906 (Show Summary) | $11,142.04 USD | $222.84 USD | | $10,919.20 USD | |

PAYMENT DETAILS

Payment Method: ACH
Reference Number: 504889348

Routing Status: Sent
Transaction Date: 14 Jan. 2015
Projected Settlement: 15 Jan. 2015

LINE ITEMS (10) — 600

| Line # | Payable Reference | Gross Amount | Discount | Adjustment | Net Amount Paid | Scheduled Payment |
|---|---|---|---|---|---|---|
| 1 | Invoice: 46913 (Show Summary) | $1,224.40 USD | $24.49 USD | | $1,199.91 USD | |

MATCHING INVOICE
Original Invoice Date: 18 Feb 2015

MATCHING DISCOUNT

Check the details on scheduled payment info: SP53243, SP54354, SP4325325
                                              602A      602B    602C

| | | | | | | |
|---|---|---|---|---|---|---|
| | | | | | Invoice Subtotal: | $1,224.40 USD |
| | | | | | Total Tax: | $0.00 USD |
| | | | | | Invoice Total: | $1,199.51 USD |
| 2 | Invoice: 46906 (Show Summary) | $11,142.04 USD | $222.84 USD | | $10,919.20 USD | |

FIG. 6

AUTOMATIC RECONCILIATION OF DATA STRUCTURES

TECHNICAL FIELD

This document generally relates to systems and methods for computer software. More specifically, this document relates to automatic reconciliation of data structures.

BACKGROUND

Many business-to-business (B-to-B) transactions, such as a company purchasing goods from a supplier, are handled via interactions between computer programs. Sometimes there may be a variety of different computer systems involved in a single transaction. One piece of software running on a supplier system may handle requests for proposals from companies and send terms for a transaction. Another piece of software running on a company system may receive the proposal and send a purchase order. Other pieces of software running on the supplier system and company system may handle invoicing and remittance of payments, respectively, and so on.

One area in which this can create an issue is in the area of discounts, and specifically the area of discounts provided for early payment. It is often beneficial for cash flow purposes for a supplier to offer a discount to a buyer who pays early. However, because a different system may be used to offer (and accept) the discount as to handle the remittance of payments, it can be difficult to ensure that the payment amounts are accurate.

Reconciliation of payment amounts is a common task for companies to perform. It is not uncommon, for example, for a payment to be received that differs from the invoiced amount due to a buyer leaving out freight, tax, or some other ancillary charge, or simply due to a miscommunication about the cost of certain items and/or which charges are included in a proposal. This reconciliation takes a tremendous amount of effort, however, and can be especially difficult in the case of early payment discounts, which can be difficult to track. One aspect that makes them difficult to track is that the amount due can actually vary based on when the payment is tendered. Thus, a remitted amount may be correct if paid on a certain date, but be incorrect if paid on a later date.

The challenge for buyers is that the individuals initiating discount instructions at the supplier may not necessarily be the same individuals reconciling the receivables with payment and remittance data. Additionally, the supplier in some cases may not necessarily update accounts receivable data with anticipated discounts, especially if their billing systems do not support changes or such changes are locked down for security reasons.

Payment remittance information is typically stored in a data structure known as a remittance advice. The remittance advice typically will indicate the invoice to which the payment pertains and the amount of the payment. What is needed is a mechanism to automatically reconcile remittance advice data structures in cases where early payment discounts are provided.

BRIEF DESCRIPTION OF DRAWINGS

The present disclosure is illustrated by way of example and not limitation in the figures of the accompanying drawings, in which like references indicate similar elements and in which:

FIG. 4 is a screen capture illustrating a user interface, in accordance with an example embodiment, displaying a matched remittance advice data structure.

FIG. 6 is a screen capture illustrating a user interface, in accordance with another example embodiment, displaying an unmatched discount. Here, the system has not yet even compared the remittance advice data structure to a discount because no discount has been identified in the remittance advice data structure and there are multiple possible choices.

SUMMARY

Figure 1:
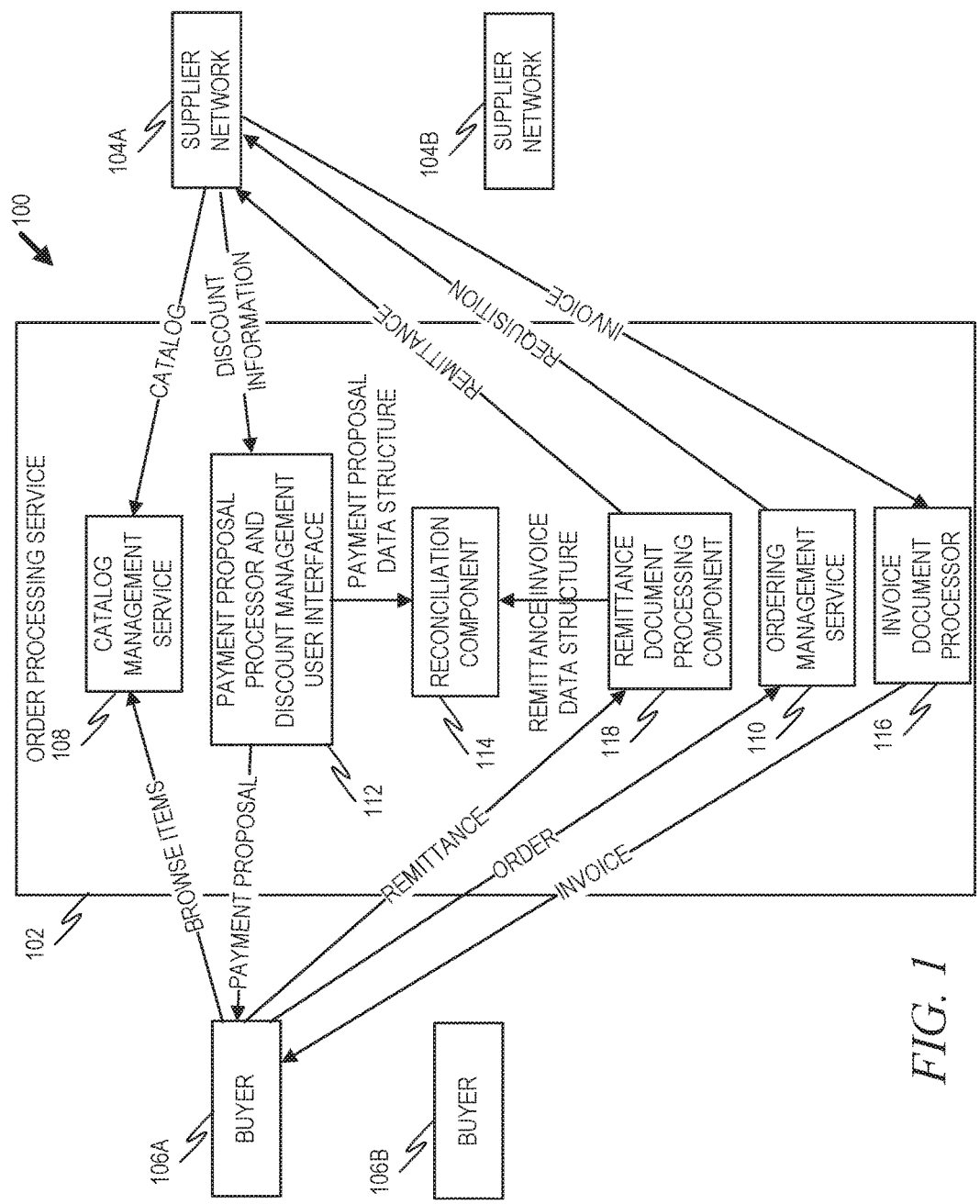
FIG. 1 is a block diagram illustrating a system, in accordance with an example embodiment, for managing orders from buyers for goods or services provided by suppliers.

In some implementations, methods and apparatus, including computer program product, are provided for reconciling remittance advice data structures. A remittance advice data structure is received by a reconciliation component, the remittance advice data structure including an amount of a remittance and a date of the remittance. Then the remittance advice data structure is matched to a payment proposal data structure corresponding to an invoice. A discount amount is calculated using one or more processors using the amount of the remittance and an amount specified in the invoice. Then discount amount is then compared to a discount specified in the payment proposal data structure to determine if the amount of the remittance matches the payment proposal data structure. The date of the remittance is compared to a date specified in the payment proposal data structure to determine if the date of the remittance matches the payment proposal data structure. An alert is then caused to be displayed on a graphical user interface to alert a user as to whether the amount of the remittance and the date of the remittance match the payment proposal data structure by displaying a message in a user interface depicting remittance information from the remittance advice data structure.

The above methods, apparatus, and computer program products may, in some implementations, further include one or more of the following features. The matching may comprise determining whether the remittance advice data structure identifies the payment proposal data structure, and, in response to a determination that the remittance advice data structure does not identify the payment proposal data structure, an invoice identification may be retrieved from the remittance advice data structure, a search may be performed on multiple payment proposal data structures using the invoice identification to obtain a plurality of payment proposal data structures containing the invoice identification, the plurality of payment proposal data structures may be displayed in the user interface, and a selection of the payment proposal data structure may be received via the user interface.

The method may further comprise, in response to a determination that the amount of the remittance does not match the payment proposal data structure, obtaining one or more additional remittance advice data structures, and determining whether the amount of the remittance in the remittance advice data structure, in combination with remittance amounts in the one or more additional remittance advice data structures, matches the payment proposal data structure.

The user may be located in a supplier network. The alerting may include placing alert text within a vicinity of an amount of remittance in the user interface. The alerting may alternatively include placing alert text within a vicinity of a date of remittance in the user interface.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a discount management tool is provided that automatically reconciles remittance advice data structures based on early payments and/or early payment information. Buyers are provided a way to quickly demonstrate that the supplier has been paid the appropriate amount. Suppliers are provided a way to quickly understand that the amount paid in the remittance advice data structure is indeed the appropriate amount. Ultimately, both the buyer and supplier are able to understand that the discount amount for each line in the remittance advice data structure correlates to the discount instruction amount, the payment settlement date equals the date selected by the supplier on the discount instruction, the discount amount in the remittance advice data structure is the result of the supplier's own action (not the buyer's), and the invoice amount in the remittance advice data structure does indeed equal the invoice amount on the original invoice. If any of these facts are untrue for a given remittance advice data structure, the supplier may be alerted to that fact.

FIG. 1 is a block diagram illustrating a system 100, in accordance with an example embodiment, for managing orders from buyers for goods or services provided by suppliers. The system 100 includes an order management service 102. The order processing service 102 may be implemented on, for example, a computer server, although in an example embodiment the order processing service 102 services many different buyers and suppliers simultaneously and thus is maintained on a series of servers operated by an order processing service 102 provider.

Supplier catalogs are stored on supplier networks 104A, 104B in, for example, a standard Catalog Interchange Format (CIF). An index to the supplier catalogs is created and stored on the order management service 102. When a buyer 106A, 106B, which may include a corporation, wishes to purchase an item or service, a query is submitted to the order management service 102. A catalog management service 108 on the order processing service 102 searches the index based on the buyer submitted query and returns, as the search result, universal resource locators (URLs) pointing to catalog data on the appropriate supplier network 104A, 104B.

It should be noted that while two buyers 106A, 106B and two supplier networks 104A, 104B are depicted in this diagram, any number of buyers 106A, 106B, and supplier networks 104A, 104B may be present. Additionally, for simplicity, only communications from a single buyer 106A and a single supplier network 104A are depicted in this figure, but the other buyer 106B and the other supplier network 104B may also be involved in similar communications.

The buyer 106A, 106B follows one or more URLs to retrieve the catalog data directly from the supplier network 104A, 104B. Based on the catalog data retrieved from the supplier network 104A, 104B, the buyer 106A, 106B generates a requisition and submits the requisition via an ordering management service 110 on the order management service 102. Prior to requisition, the supplier network 104A, 104B may indicate that an early payment discount is offered and may provide the order processing service 102 with information about this early payment discount. This discount may either be provided as part of the catalog data or be provided independently of the catalog data. A payment proposal processor and discount management user interface 112 may be provided to allow the supplier to offer the discount and provide terms of the discount (e.g., how much of a discount, when payment must be received in order for the discount to be valid, etc.). Once the terms of the discount have been established, a payment proposal may be generated and sent to the buyer 106A, and a payment proposal data structure may be forwarded to a reconciliation component 114.

The buyer 106A, 106B may desire to purchase the item or service utilizing the early payment discount option. The ordering management service 110 translates the requisition into a format desired by the particular supplier to which the requisition is destined, and forwards the requisition on to the supplier network 104A, 104B in most cases.

In response, the supplier acknowledges the requisition and requests that an invoice be generated and sent to the order management service 102. Specifically, an invoice document processor 116 receives this invoice, performs preprocessing of it, and forwards it to the buyer 106A, and a remittance invoice data structure is sent to the reconciliation component 114.

Later, the buyer 106A, 106B provides payment for the item or service. This payment is also known as a remittance. This remittance is received by a remittance document processing component 118, which processes the remittance. If payment is made through the order management service 102, this may include processing the actual payment of funds from the buyer 106A, 106B to the supplier network 104A, 104B. The processing also includes generating a remittance advice data structure corresponding to the remittance and populating the remittance advice data structure with information about the remittance (e.g., buyer ID, seller ID, invoice ID (if available), amount of remittance, date of remittance, etc.). This remittance advice data structure is then forwarded to the reconciliation component 114.

As described above, in an example embodiment, a payment proposal processor and discount management user interface 112 is provided to allow supplier networks 104A, 104B to create payment proposals. This payment proposal processor and discount management user interface 112 automatically tracks user information (e.g., who actually made a discount offer). This information, as will be seen later, will be displayed in a separate user interface used to reconcile remittance advice data structures with payment proposal data structures, which can be performed by the reconciliation component 114.

Communication between the order processing service 102 and the supplier networks 104A, 104B may use a variety of different order communication options, including, for example, Commerce XML (cXML), Internet-based Electronic Data Interchange (Internet EDI), Value Added Network-based Electronic Data Interchange (VAN EDI), Open Buying on the Internet (OBI), Remote driven supplier ordering website, Secure HTML, and e-mail.

Figure 2:
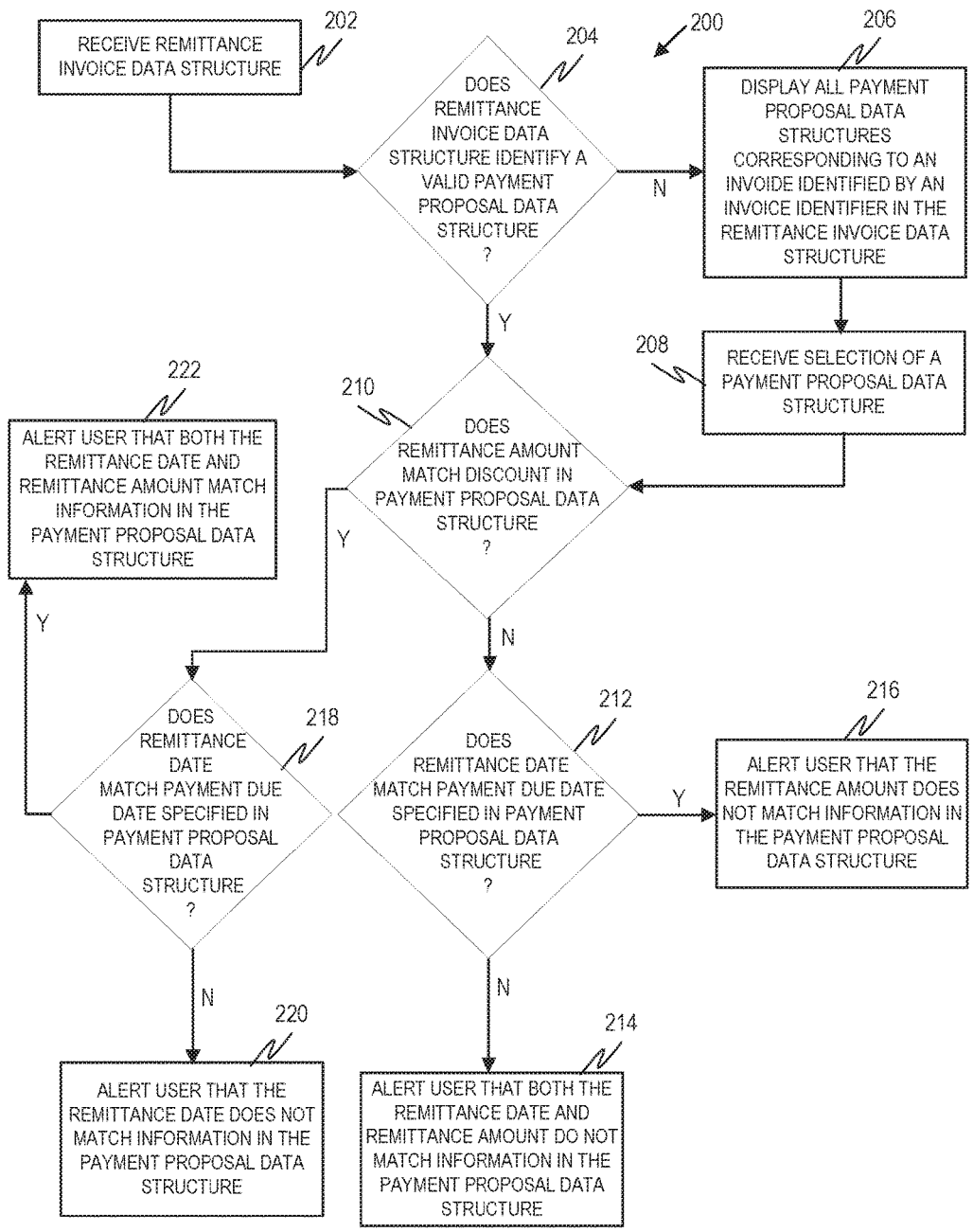
FIG. 2 is a flow diagram illustrating a method, in accordance with an example embodiment, of automatically reconciling a remittance advice data structure with a payment proposal data structure.

FIG. 2 is a flow diagram illustrating a method 200, in accordance with an example embodiment, of automatically reconciling a remittance advice data structure with a payment proposal data structure. In an example embodiment, the method 200 may be performed by the reconciliation component 114 of FIG. 1. At operation 202, a remittance advice data structure is received. At operation 204, it is determined whether the remittance advice data structure identifies a valid payment proposal data structure. If not, then at operation 206 all payment proposal data structures corresponding to an invoice identified by an invoice identifier in the remittance advice data structure are displayed to a user. At operation 208, a selection of a payment proposal data structure from the payment proposal data structures corresponding to the invoice is received.

At operation 210, it is determined whether a remittance amount listed in the remittance advice data structure matches a discount specified in the payment proposal data structure. This may include, for example, obtaining a gross payment amount from the remittance advice data structure, multiplying it by a percentage discount specified in the payment proposal data structure, and determining whether the remittance amount listed in the remittance advice data structure matches the gross payment amount minus the product of the gross payment amount and the percentage discount. In an alternative embodiment, the discount amount is provided as a fixed amount as opposed to a percentage of gross, and the determination in operation 210 may be made by obtaining a gross payment amount from the remittance advice data structure and determining whether the remittance amount listed in the remittance advice data structure equals the gross payment amount minus the discount specified in the payment proposal data structure.

If they do not match, then at operation 212 it is determined whether a remittance date listed in the remittance advice data structure matches a payment due date specified in the payment proposal data structure. It should be noted that in some cases the remittance date listed in the remittance advice data structure is added by the supplier when the payment is actually received, while in other cases the remittance date listed is simply provided by the buyer. The case for the supplier's system adding the remittance date is that this can act to prevent fraud where a buyer might otherwise incorrectly list an earlier date of remittance than the date on which the payment is actually made. Nevertheless, if the dates do not match, then at operation 214 a user is alerted, via a user interface, that both the remittance amount and the date of remittance do not match the information in the payment proposal data structure.

If the dates do match, then at operation 216 a user is alerted, via a user interface, that the remittance amount does not match the information in the payment proposal data structure.

If at operation 210 it is determined that the remittance amount does match the discount specified in the payment proposal data structure, then at operation 218 it is determined whether a remittance date listed in the remittance advice data structure matches a payment due date specified in the payment proposal data structure. Operation 218 may be identical to operation 212, except that the result of the determination is different. Specifically, if it is determined at operation 218 that the dates do not match, then at operation 220 a user is alerted, via a user interface, that the date of the remittance does not match the information in the payment proposal data structure. On the other hand, if it is determined at operation 218 that the dates do match, then at operation 222 a user is alerted, via a user interface, that the remittance amount and date from the remittance advice data structure match the information from the payment proposal data structure.

In some example embodiments, there may be multiple remittance advice data structures that correspond to a single payment proposal. This may occur where, for example, the buyer has elected (either with or without the supplier's consent) to pay for the item(s) in installment payments, or where the buyer has accidentally split the payment into multiple payments. In the latter case, for example, the buyer may have incorrectly entered a lower payment amount when remitting a payment, and may attempt to correct that error by adding the remainder in a second payment. An issue arises, however, in that this may make matching the remittance amount in the remittance advice data structure to the information in the payment proposal data structure more challenging.

In order to handle such cases, in an example embodiment, a discount professional software tool may automatically track multiple remittance advice data structures corresponding to the same payment proposal data structure. While after the first remittance advice data structure corresponding to the payment proposal data structure is received, the system may indicate to the user that the remittance amount does not match the information in the payment proposal data structure. Upon receipt of the second remittance advice data structure corresponding to the payment proposal data structure, the remittance amounts of the two remittance advice data structures may be added together and compared with the information in the payment proposal data structure. Thus, if the second remittance advice data structure winds up causing what was thought to be an incorrect payment to be a portion of a correct payment, then the indication that the remittance amount does not match the information in the payment proposal data structure may be removed and instead the user may be notified that the combined remittance amounts in the remittance advice data structures match the information in the payment proposal data structure. If the two remittances were made on separate dates, there still may be an issue of date inconsistency, but here the system may simply check to ensure that both dates are prior to the date required by the discount in the payment proposal data structure, in order to prevent, for example, the buyer taking advantage of a discount for an entire order that was due to be paid by a particular date when only one of multiple payments for the order was paid prior to the date.

Figure 3:
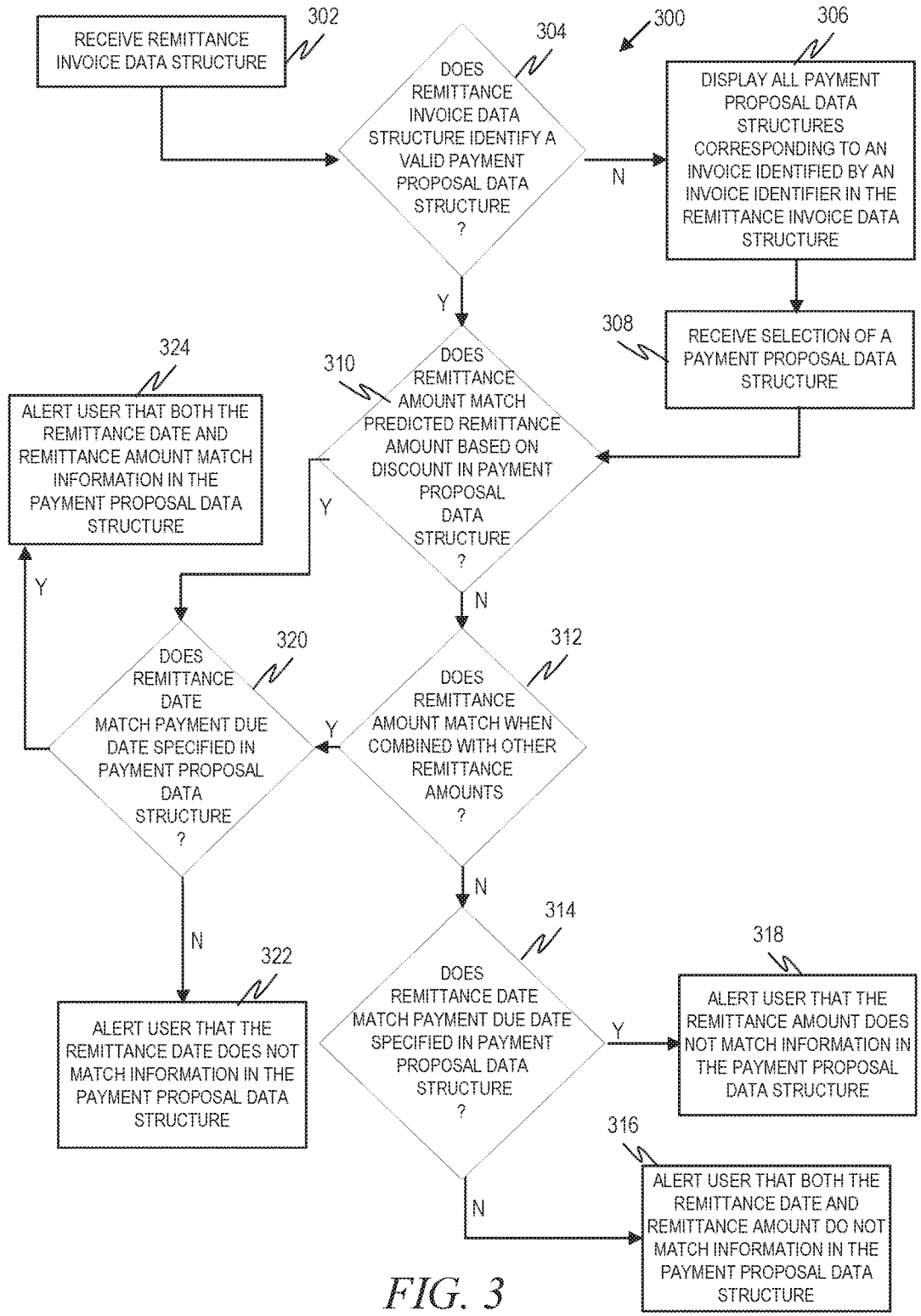
FIG. 3 is a flow diagram illustrating a method, in accordance with an example embodiment, of automatically reconciling multiple remittance advice data structures with a payment proposal data structure.

FIG. 3 is a flow diagram illustrating a method 300, in accordance with an example embodiment, of automatically reconciling multiple remittance advice data structures with a payment proposal data structure. In an example embodiment, the method 300 may be performed by the reconciliation component 114 of FIG. 1. At operation 302, a remittance advice data structure is received. At operation 304, it is determined whether the remittance advice data structure identifies a valid payment proposal data structure. If not, then at operation 306 all payment proposal data structures corresponding to an invoice identified by an invoice identifier in the remittance advice data structure are displayed to a user. At operation 308, a selection of a payment proposal data structure from the payment proposal data structures corresponding to the invoice is received.

At operation 310, it is determined whether a remittance amount listed in the remittance advice data structure matches a predicted remittance amount based on a discount specified in the payment proposal data structure. This may include, for example, obtaining a gross payment amount from the remittance advice data structure, multiplying it by a percentage discount specified in the payment proposal data structure, and determining whether the remittance amount listed in the remittance advice data structure matches the gross payment amount minus the product of the gross payment amount and the percentage discount. In an alternative embodiment, the discount amount is provided as a fixed amount as opposed to a percentage of gross, and the determination in operation 310 may be made by obtaining a gross payment amount from the remittance advice data structure and determining whether the remittance amount listed in the remittance advice data structure equals the gross payment amount minus the discount specified in the payment proposal data structure.

If they do not match, then at operation 312 it is determined whether a remittance amount listed in the remittance advice data structure, when combined with a remittance amount from one or more previously received remittance advice data structures corresponding to the payment proposal data structure, matches a discount specified in the payment proposal data structure If not, then at operation 314 it is determined whether a remittance date listed in the remittance advice data structure matches a payment due date specified in the payment proposal data structure. It should be noted that in some cases the remittance date listed in the remittance advice data structure is added by the supplier when the payment is actually received, while in other cases the remittance date listed is simply provided by the buyer. The case for the supplier's system adding the remittance date is that this can prevent fraud where a buyer might otherwise incorrectly list an earlier date of remittance than the date on which the payment is actually made. Nevertheless, if the dates do not match, then at operation 316 a user is alerted, via a user interface, that both the remittance amount and the date of remittance do not match the information in the payment proposal data structure.

If the dates do match, then at operation 318 a user is alerted, via a user interface, that the remittance amount does not match the information in the payment proposal data structure.

If at operation 310 it is determined that the remittance amount does match the discount specified in the payment proposal data structure, or at operation 312 it determined that the remittance amount, combined with remittance amounts from one or more previously received remittance advice data structures, matches the discount specified in the payment proposal data structure, then at operation 320 it is determined whether a remittance date listed in the remittance advice data structure matches a payment due date specified in the payment proposal data structure. If not, then at operation 322 a user is alerted, via the user interface, that the remittance date does not match the information in the payment proposal data structure. Otherwise, at operation 324, a user is alerted, via a user interface, that the remittance amount and date from the remittance advice data structure match the information from the payment proposal data structure.

In an example embodiment, a user interface is provided that informs a user whether or not a remittance advice data structure has been correctly reconciled. This user interface may be displayed, for example, in a discount professional software tool, which may operate on a buyer's computer network or may operate on an order management service server in conjunction with client software operating on the buyer's computer network.

FIG. 4 is a screen capture illustrating a user interface 400, in accordance with an example embodiment, displaying a matched remittance advice data structure. Information about the remittance advice is displayed at reference numeral 402. Notably, the gross amount of a first line item 404 is $1224.40, while a discount is $24.49, leaving a net amount paid of $1,199.91. Here, the system has determined that the discount of $24.49 matches a discount offered by the supplier. In order to visually display this, reference numeral 406 indicates that the $24.49 discount has been "matched". Additionally, information about the matching discount, specifically the individual who accepted the discount and the terms of the discount, is displayed at 408. In this manner, a supplier may better understand that the discount reflected in the remittance advice data structure has been properly reconciled. Additionally, the date of the projected settlement 410 matches the date identified as part of the discount 408.

Figure 5:
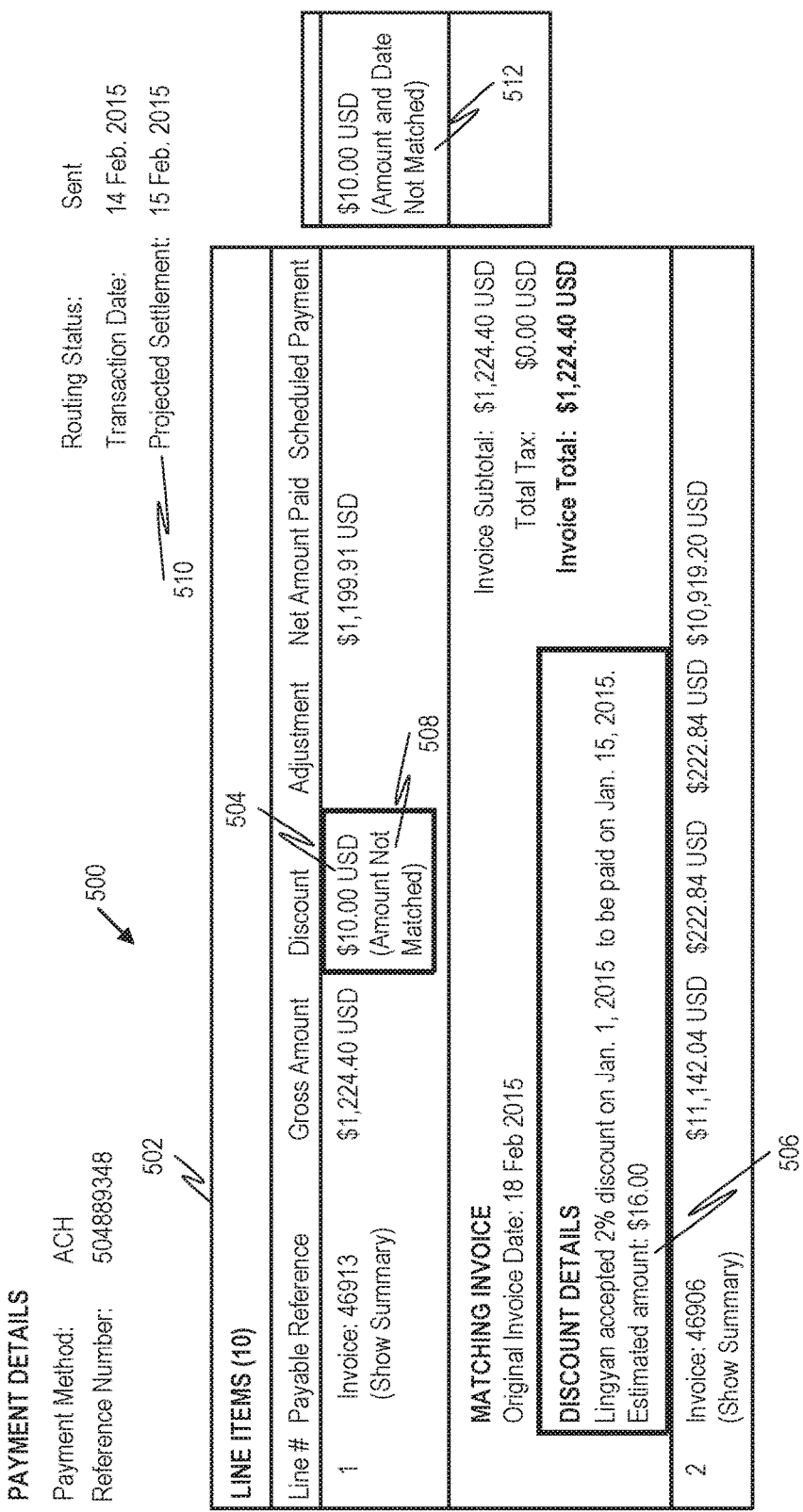
FIG. 5 is a screen capture illustrating a user interface, in accordance with an example embodiment, displaying an unmatched remittance advice data structure.

FIG. 5 is a screen capture illustrating a user interface, in accordance with an example embodiment, displaying an unmatched remittance advice data structure. Information about the remittance advice is displayed at reference numeral 502. Here, the discount amount 504 does not align with the discount instruction 506 either automatically or manually taken by the supplier. Thus, reference numeral 508 indicates that the amount does not match. Additionally, the date 510 of the remittance does not match the date in the discount instructions 506. As such, a message 512 is displayed to the user indicating that both the amount and the date of the remittance do not match the discount terms. It should be noted that if that just the amount didn't match, a message indicating that the amount didn't match would be displayed in lieu of the message 512, while if just the date didn't match, a message indicating that the date didn't match would be displayed in lieu of the message 512.

Furthermore, an invoice may have more than one payment proposal. For example, a particular discount may be given for payment by a first date while another discount is given for payment by a second date. The remittance advice data structure may indicate a proposal ID submitted by the buyer indicating the discount proposal accepted by the buyer. In the event the remittance advice data structure does not include this proposal ID, and the system finds more than one payment proposal for the invoice, the user may be prompted to manually reconcile which discount matches. FIG. 6 is a screen capture illustrating a user interface 600, in accordance with another example embodiment, displaying an unmatched discount. Here, the system has not yet even compared the remittance advice data structure to a discount because no discount has been identified in the remittance advice data structure and there are multiple possible choices. As such, discount possibilities 602A, 602B, and 602C are displayed in the user interface 600, allowing the user to review the corresponding discount proposals and select which of these discount proposals the remittance advice data structure applies to. Once the user so selects, the system can then check to determine whether the amount in the remittance advice data structure matches the amount of the discount proposal and whether the date in the remittance advice data structure matches the date in the discount proposal.

Figure 7:
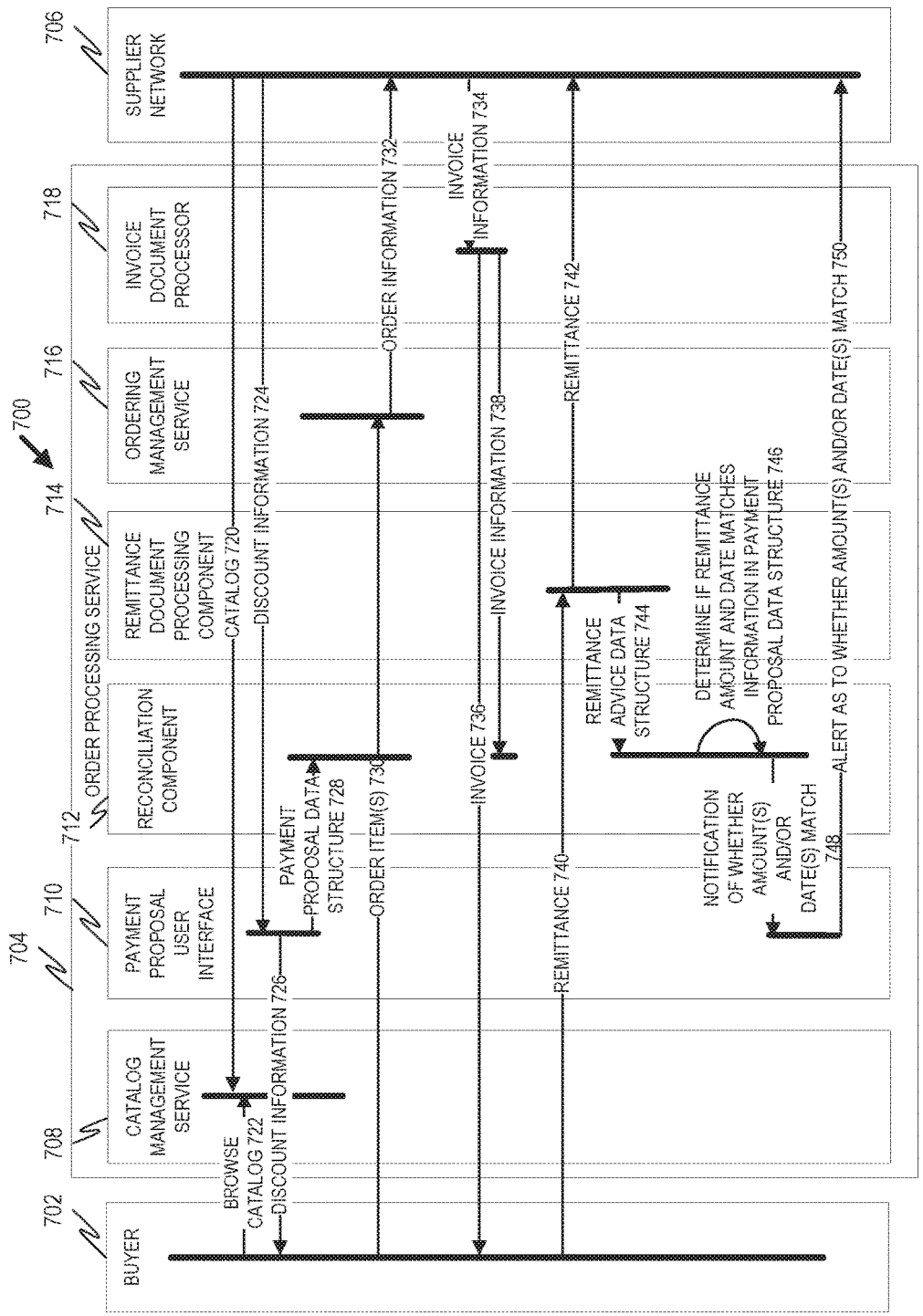
FIG. 7 is an interaction diagram illustrating a method, in accordance with an example embodiment, of reconciling remittance advice data structures with payment proposal data structures.

FIG. 7 is an interaction diagram illustrating a method 700, in accordance with an example embodiment, of reconciling remittance advice data structures with payment proposal data structures. The method 700 utilizes a buyer 702, an order processing service 704, and a supplier network 706. The order processing service 704 includes a catalog management service 708, a payment proposal user interface 710, a reconciliation component 712, a remittance document processing component 714, an ordering management service 716, and an invoice document processor 718.

At operation 720, the supplier network 706 provides an item catalog to the catalog management service 708. At operation 722, the buyer 702 browses the catalog. At operation 724, discount information is provided by the supplier network 706 to the payment proposal user interface 710. At operation 726, this discount information is sent to the buyer 702. It should be noted that while this figure displays operation 724 being performed after operation 722, in example embodiments the discount information can be provided at any time, and in fact may be provided along with the catalog at operation 720.

At operation 728, the payment proposal user interface 710 generates a payment proposal data structure, populates it with the discount information, and sends it to the reconciliation component 712.

At operation 730, the buyer 702 orders one or more items, and this order information is sent to the ordering management service 716. The ordering management service 716 forwards this information to the supplier network 706 at operation 732. At operation 734, the supplier network 706 provides invoice information for the order to the invoice document processor 718. The invoice document processor 718 then sends an invoice to the buyer 702 at operation 736, and sends invoice information to the reconciliation component 712 at operation 738.

At operation 740, the buyer 702 sends a remittance to the remittance document processing component 714. The remittance document processing component 714 may send this remittance to the supplier network 706 at operation 742. The remittance document processing component 714 may also generate a remittance advice data structure corresponding to the remittance, populate it with remittance information, and send it to the reconciliation component 712 at operation 744.

At this point, the reconciliation component 712 has one or more payment proposal data structures and one or more remittance advice data structures and may undertake at operation 746 to determine if the remittance amount(s) and date(s) match information in the payment proposal data structures. Generally, operation 746 may correspond to the operations performed as described above with respect to FIGS. 2 and 3. These operations will not be repeated here.

At operation 748, the payment proposal user interface 710 is informed of whether the amount(s) and/or date(s) match, and then may undertake at operation 750 to alert a user at the supplier network 706 as to whether the amount(s) and/or date(s) match.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 8:
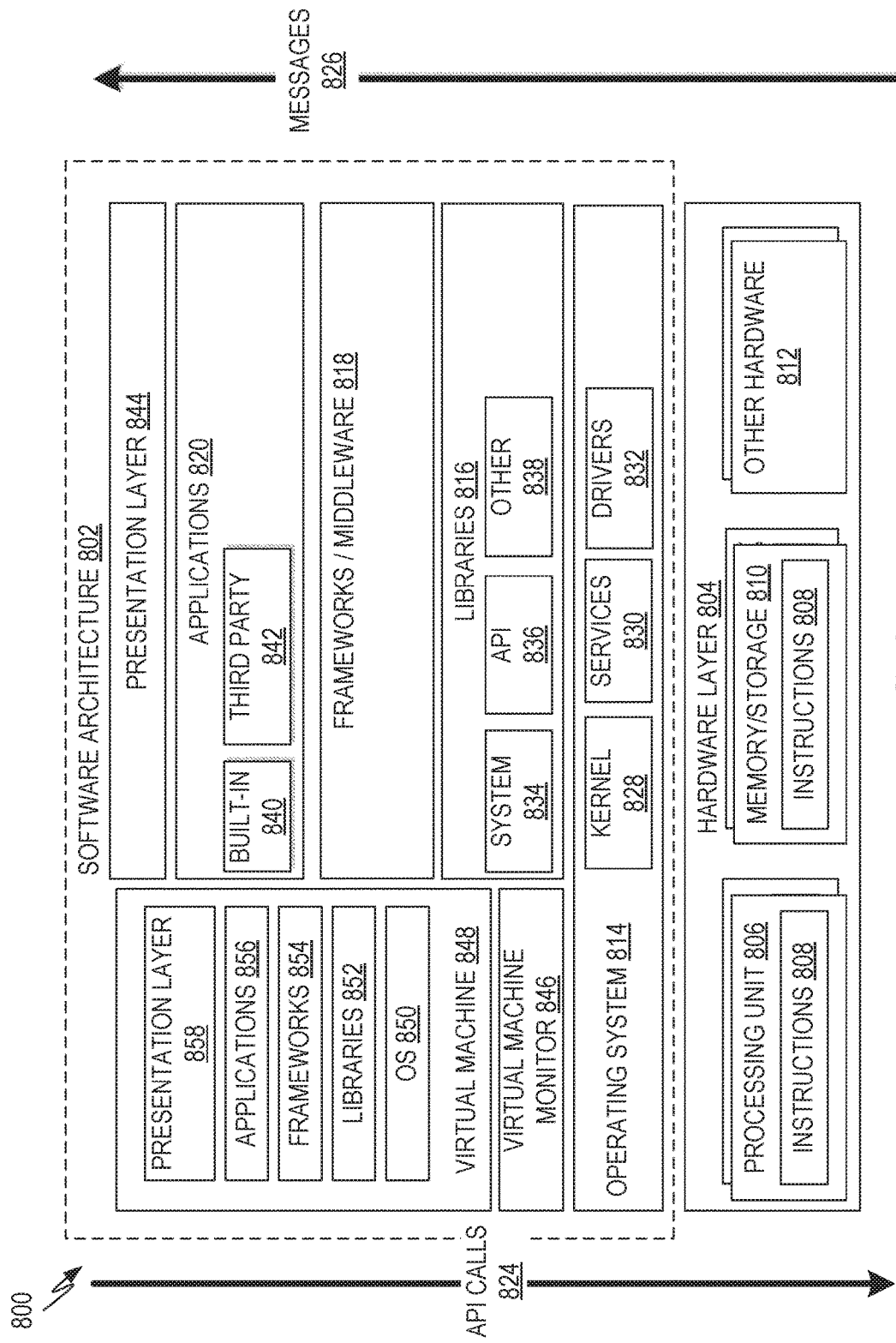
FIG. 8 is a block diagram illustrating a representative software architecture, which may be used in conjunction with various hardware architectures herein described.

FIG. 8 is a block diagram 800 illustrating a representative software architecture 802, which may be used in conjunction with various hardware architectures herein described. FIG. 8 is merely a non-limiting example of a software architecture 802, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature, and not all software architectures have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware machine (such as the machine 900 of FIG. 9, for example). The virtual machine 848 is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Example Machine Architecture and Machine-Readable Medium

Figure 9:
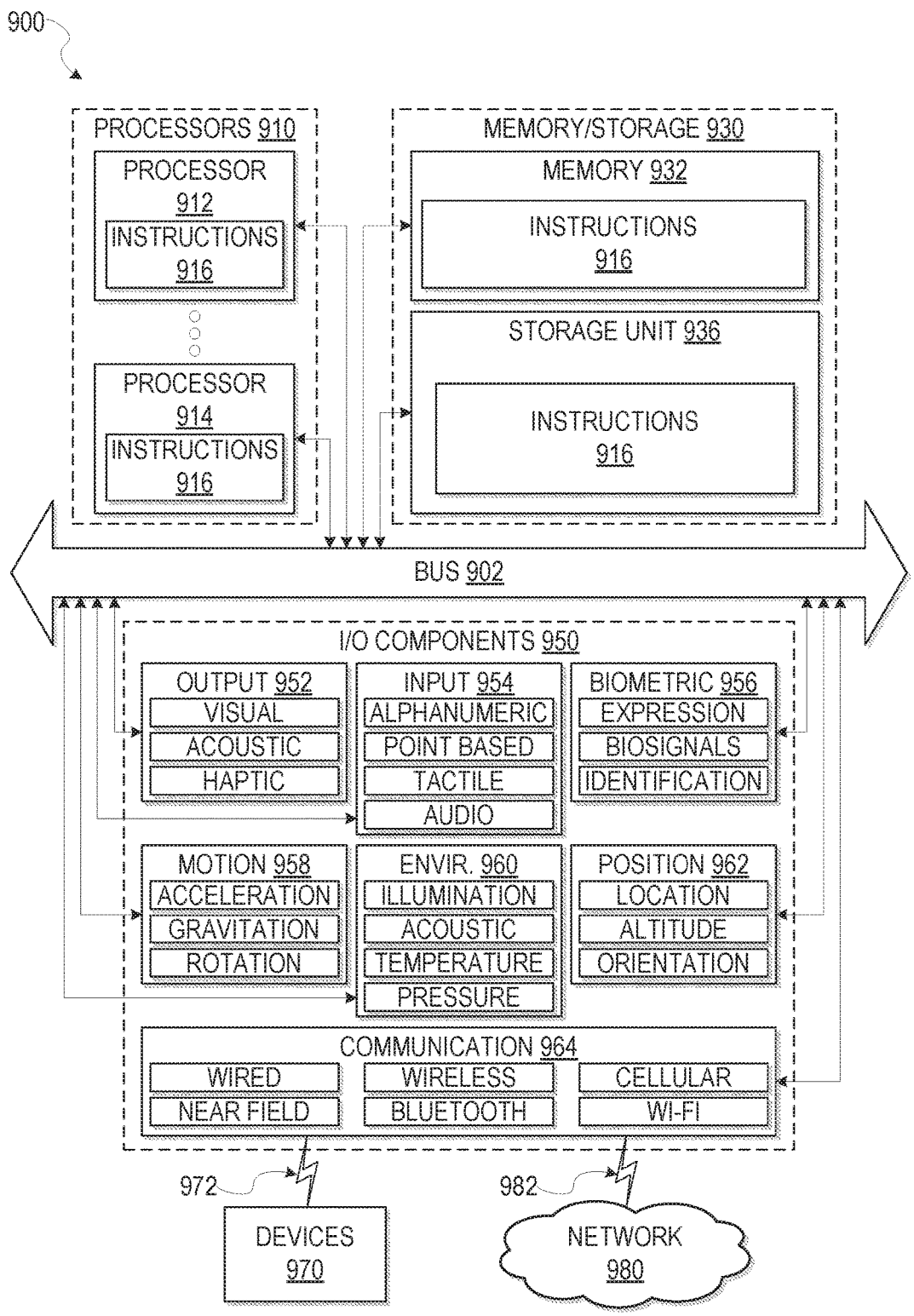
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 916 from a machine-readable medium (e.g., a machine-readable storage medium) and perform any one or more of the methodologies discussed herein. Specifically, FIG. 9 shows a diagrammatic representation of the machine 900 in the example form of a computer system, within which the instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagram of FIGS. 2-3. Additionally, or alternatively, the instructions 916 may implement modules of FIG. 1, and so forth. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 912 and a processor 914 that may execute the instructions 916. The term "processor" is intended to include a multi-core processor 912, 914 that may comprise two or more independent processors 912, 914 (sometimes referred to as "cores") that may execute the instructions 916 contemporaneously. Although FIG. 9 shows multiple processors 910, the machine 900 may include a single processor 912, 914 with a single core, a single processor 912, 914 with multiple cores (e.g., a multi-core processor 912, 914), multiple processors 912, 914 with a single core, multiple processors 912, 914 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor 912, 914's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store the instructions 916 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of reconciling remittance advice data structures comprising:

receiving a remittance advice data structure, the remittance advice data structure including an amount of a remittance and a date of the remittance, the receiving performed in response to an order management service having translated a requisition into a format associated with a particular supplier to which the requisition is destined and the forwarding of the requisition to the particular supplier;

matching, using one or more hardware processors, the remittance advice data structure to a payment proposal data structure corresponding to an invoice;

calculating, using the one or more hardware processors, a discount amount using the amount of the remittance and an amount specified in the invoice;

comparing, using the one or more hardware processors, the discount amount to a discount specified in the payment proposal data structure to determine if the amount of the remittance matches the payment proposal data structure;

comparing, using the one or more hardware processors, the date of the remittance to a date specified in the payment proposal data structure to determine if the date of the remittance matches the payment proposal data structure;

causing an alert to be displayed on a graphical user interface to alert the particular supplier as to whether the amount of the remittance and the date of the remittance match the payment proposal data structure by displaying a message in the graphical user interface depicting remittance information from the remittance advice data structure;

receiving a second remittance advice data structure, the second remittance advice data structure including an amount of a second remittance and a date of the second remittance;

matching, using one or more hardware processors, the second remittance advice data structure to a second payment proposal data structure corresponding to a second invoice;

calculating, using the one or more hardware processors, a second discount amount using the amount of the second remittance and an amount specified in the second invoice;

comparing, using the one or more hardware processors, the second discount amount to a second discount specified in the second payment proposal data structure to determine if the amount of the second remittance matches the second payment proposal data structure;

comparing, using the one or more hardware processors, the date of the second remittance to a second date specified in the second payment proposal data structure to determine if the date of the second remittance matches the second payment proposal data structure;

in response to a determination that the amount of the second remittance matches the second payment proposal data structure and the date of the second remittance matches the second payment proposal data structure, automatically reconciling, using the one or more hardware processors, the second remittance advice data structure and the second payment proposal data structure; and displaying results of the automatic reconciliation to the particular supplier.

2. The method of claim 1, wherein the matching comprises:

determining whether the remittance advice data structure identifies the payment proposal data structure; and in response to a determination that the remittance advice data structure does not identify the payment proposal data structure:

retrieving an invoice identification from the remittance advice data structure;

performing a search on multiple payment proposal data structures using the invoice identification to obtain a plurality of payment proposal data structures containing the invoice identification;

displaying the plurality of payment proposal data structures in the graphical user interface; and receiving a selection of the payment proposal data structure via the graphical user interface.

3. The method of claim 1, further comprising, in response to a determination that the amount of the remittance does not match the payment proposal data structure:

obtaining one or more additional remittance advice data structures; and determining whether the amount of the remittance in the remittance advice data structure, in combination with remittance amounts in the one or more additional remittance advice data structures, matches the payment proposal data structure.

4. The method of claim 1, wherein the user is located in a supplier network.

5. The method of claim 1, wherein the alerting includes placing alert text within a vicinity of an amount of remittance in the graphical user interface.

6. The method of claim 1, wherein the alerting includes placing alert text within a vicinity of a date of remittance in the graphical user interface.

7. The method of claim 1, wherein the payment proposal data structure is generated by a payment proposal processor and discount management user interface in an order processing service.

8. A system comprising:

an order processing service comprising:

one or more hardware processors;

a catalog management service storing one or more catalogs of items offered by one or more suppliers;

a payment proposal processor and discount management user interface configured to obtain discount amounts and terms offered by the one or more suppliers and to generate a payment proposal data structure corresponding to each discount;

a remittance document processing component configured to receive a remittance advice from a buyer and create a remittance advice data structure corresponding to the remittance advice, the receiving performed in response to an order management service having translated a requisition into a format associated with a particular supplier to which the requisition is destined and the forwarding of the requisition to the particular supplier; and a reconciliation component executable by the one or more hardware processors and configured to:

retrieve the remittance advice data structure, the remittance advice data structure including an amount of a remittance and a date of the remittance;

match the remittance advice data structure to a payment proposal data structure corresponding to an invoice;

calculate a discount amount using the amount of the remittance and an amount specified in the invoice;

compare the discount amount to a discount specified in the payment proposal data structure to determine if the amount of the remittance matches the payment proposal data structure;

compare the date of the remittance to a date specified in the payment proposal data structure to determine if the date of the remittance matches the payment proposal data structure;

communicate the results of the comparing of the discount amount and the comparing of the date of the remittance to the payment proposal processor and discount management user interface;

retrieve the remittance advice data structure; the remittance advice data structure including an amount of a remittance and a date of the remittance;

match a second remittance advice data structure to a second payment proposal data structure corresponding to a second invoice;

calculate a second discount amount using the amount of a second remittance in the second remittance advice data structure and an amount specified in the second invoice;

compare the second discount amount to a second discount specified in the second payment proposal data structure to determine if the amount of the second remittance matches the second payment proposal data structure;

compare the date of the second remittance in the second remittance advice data structure to a date specified in the second payment proposal data structure to determine if the date of the second remittance matches the second payment proposal data structure;

in response to a determination that the amount of the second remittance matches the second payment proposal data structure and the date of the second remittance matches the second payment proposal data structure, automatically reconcile, by the one or more hardware processors, the second remittance advice data structure and the second payment proposal data structure;

wherein the payment proposal processor and discount management user interface is further configured to alert the particular supplier as to whether the amount of the remittance and the date of the remittance match the payment proposal data structure by displaying a message in a graphical user interface depicting remittance information from the remittance advice data structure; and displaying results of the automatic reconciliation to the particular supplier.

9. The system of claim 8, wherein the matching comprises:

determining whether the remittance advice data structure identifies the payment proposal data structure; and in response to a determination that the remittance advice data structure does not identify the payment proposal data structure:

retrieving an invoice identification from the remittance advice data structure;

performing a search on multiple payment proposal data structures using the invoice identification to obtain a plurality of payment proposal data structures containing the invoice identification;

displaying the plurality of payment proposal data structures in the graphical user interface; and receiving a selection of the payment proposal data structure via the graphical user interface.

10. The system of claim 8, wherein the reconciliation component is further configured to, in response to a determination that the amount of the remittance does not match the payment proposal data structure:

obtain one or more additional remittance advice data structures; and determine whether the amount of the remittance in the remittance advice data structure, in combination with remittance amounts in the one or more additional remittance advice data structures, matches the payment proposal data structure.

11. The system of claim 8, wherein the user is located in a supplier network.

12. The system of claim 8, wherein the alerting includes placing alert text within a vicinity of an amount of remittance in the graphical user interface.

13. The system of claim 8, wherein the alerting includes placing alert text within a vicinity of a date of remittance in the graphical user interface.

14. A non-transitory machine-readable storage medium comprising instructions, which when implemented by one or more machines, cause the one or more machines to perform operations comprising:

receiving a remittance advice data structure, the remittance advice data structure including an amount of a remittance and a date of the remittance, the receiving performed in response to an order management service having translated a requisition into a format associated with a particular supplier to which the requisition is destined and the forwarding of the requisition to the particular supplier;

matching, using one or more hardware processors, the remittance advice data structure to a payment proposal data structure corresponding to an invoice;

calculating, using the one or more hardware processors, a discount amount using the amount of the remittance and an amount specified in the invoice;

comparing, using the one or more hardware processors, the discount amount to a discount specified in the payment proposal data structure to determine if the amount of the remittance matches the payment proposal data structure;

comparing, using the one or more hardware processors, the date of the remittance to a date specified in the payment proposal data structure to determine if the date of the remittance matches the payment proposal data structure;

causing an alert to be displayed on a graphical user interface to alert the particular supplier as to whether the amount of the remittance and the date of the remittance match the payment proposal data structure by displaying a message in the graphical user interface depicting remittance information from the remittance advice data structure;

receiving a second remittance advice data structure, the second remittance advice data structure including an amount of a second remittance and a date of the second remittance;

matching, using one or more hardware processors, the second remittance advice data structure to a second payment proposal data structure corresponding to a second invoice;

calculating, using the one or more hardware processors, a second discount amount using the amount of the second remittance and an amount specified in the second invoice;

comparing, using the one or more hardware processors, the second discount amount to a second discount specified in the second payment proposal data structure to determine if the amount of the second remittance matches the second payment proposal data structure;

comparing, using the one or more hardware processors, the date of the second remittance to a second date specified in the second payment proposal data structure to determine if the date of the second remittance matches the second payment proposal data structure;

in response to a determination that the amount of the second remittance matches the second payment proposal data structure and the date of the second remittance matches the second payment proposal data structure, automatically reconciling, using the one or more hardware processors, the second remittance advice data structure and the second payment proposal data structure; and displaying results of the automatic reconciliation to the particular supplier.

15. The non-transitory machine-readable storage medium of claim 14, wherein the matching comprises:

determining whether the remittance advice data structure identifies the payment proposal data structure; and in response to a determination that the remittance advice data structure does not identify the payment proposal data structure:

retrieving an invoice identification from the remittance advice data structure;

performing a search on multiple payment proposal data structures using the invoice identification to obtain a plurality of payment proposal data structures containing the invoice identification;

displaying the plurality of payment proposal data structures in the graphical user interface; and receiving a selection of the payment proposal data structure the graphical user interface.

16. The non-transitory machine-readable storage medium of claim 14, further comprising, in response to a determination that the amount of the remittance does not match the payment proposal data structure:
   obtaining one or more additional remittance advice data structures; and
   determining whether the amount of the remittance in the remittance advice data structure, in combination with remittance amounts in the one or more additional remittance advice data structures, matches the payment proposal data structure.

17. The non-transitory machine-readable storage medium of claim 14, wherein the user is located in a supplier network.

18. The non-transitory machine-readable storage medium of claim 14, wherein the alerting includes placing alert text within a vicinity of an amount of remittance in the graphical user interface.

19. The non-transitory machine-readable storage medium of claim 14, wherein the alerting includes placing alert text within a vicinity of a date of remittance in the graphical user interface.

20. The non-transitory machine-readable storage medium of claim 14, wherein the payment proposal data structure is generated by a payment proposal processor and discount management user interface in an order processing service.

* * * * *